United States Patent
Boeckh et al.

(10) Patent No.: US 6,703,523 B1
(45) Date of Patent: Mar. 9, 2004

(54) ZWITTERIONIC POLYETHERPOLYAMINES AND PROCESS FOR THEIR PRODUCTION

(75) Inventors: Dieter Boeckh, Limburgerhof (DE); Oliver Borzyk, Speyer (DE); Michael Ehle, Ludwigshafen (DE); Ralf Nörenberg, Büttelborn (DE); Eugene P. Gosselink, Cincinnati, OH (US); Jeffrey S. DuPont, Cincinnati, OH (US); Robert H. Rohrbaugh, Cincinnati, OH (US); Kenneth N. Price, Cincinnati, OH (US); Randall S. Deinhammer, Cincinnati, OH (US)

(73) Assignee: BASF Aktiengesellschaft, Ludwigshafen (DE)

( * ) Notice: Subject to any disclaimer, the term of this patent is extended or adjusted under 35 U.S.C. 154(b) by 89 days.

(21) Appl. No.: 10/030,080

(22) PCT Filed: Jul. 5, 2000

(86) PCT No.: PCT/EP00/06295

§ 371 (c)(1),
(2), (4) Date: Jan. 11, 2002

(87) PCT Pub. No.: WO01/05872

PCT Pub. Date: Jan. 25, 2001

Related U.S. Application Data

(60) Provisional application No. 60/144,083, filed on Jul. 16, 1999.

(51) Int. Cl.$^7$ .............................................. C08G 65/325
(52) U.S. Cl. ..................... 562/564; 528/391; 528/392; 558/47; 558/158
(58) Field of Search ........................... 562/564; 558/47, 558/158; 528/391, 392

(56) References Cited

U.S. PATENT DOCUMENTS

| | | |
|---|---|---|
| 4,739,094 A | 4/1988 | Mazanek et al. |
| 5,985,999 A | 11/1999 | Dominguez et al. |

FOREIGN PATENT DOCUMENTS

| | | |
|---|---|---|
| EP | 0 111 976 | 6/1984 |
| EP | 0 112 592 | 7/1984 |
| GB | 2 168 364 | 6/1986 |

*Primary Examiner*—Robert Gerstl
(74) *Attorney, Agent, or Firm*—Oblon, Spivak, McClelland, Maier & Neustadt, P.C.

(57) ABSTRACT

A zwitterionic polyetherpolyamine comprising a linear or branched polyetherpolyamine backbone having 2 to 10 tertiary amino nitrogen atoms and a molecular weight of from 100 to 800, at least one tertiary amine end group of the polyetherpolyamine backbone contains two groups having the formula

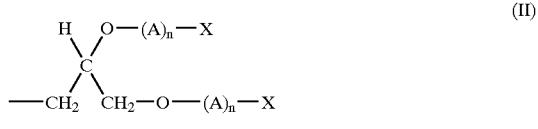

wherein A means an ethylene oxide unit, a propylene oxide unit, a unit of butylene oxides and a tetrahydrofuran unit, n is a number of from 1 to 50, X is an anionic group, with the proviso that in formula II one X may also be hydrogen and M is hydrogen, alkali metal or ammonium, or contains one group of formula I or II and one group selected from radicals consisting of

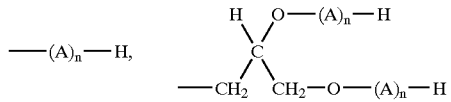

$C_1$- to $C_{22}$-alkyl and $C_7$- to $c_{22}$-aralkyl, the meaning of A and n is the same as in formula I or II, said zwitterionic polyetherpolyamine having a molecular weight up to 9,000 and optionally containing up to 100% of the nitrogen atoms quaternized, and a process for the production of zwitterionic polyetherpolyamines by alkoxylating the said polyetherpolyamine backbone, sulfating the alkoxylated polyetherpolyamine and optionally quaternizing the alkoxylated polyetherpolyamine before or after sulfation. The products obtained are used as additives in detergents.

14 Claims, No Drawings

ZWITTERIONIC POLYETHERPOLYAMINES AND PROCESS FOR THEIR PRODUCTION

This application claims the benefit of Provisional Application No. 60/144083, filed Jul. 16, 1999.

DESCRIPTION

The present invention relates to zwitterionic polyetherpolyamines and a process for their production by alkoxylation of polyetherpolyamines and introduction of anionic groups.

BACKGROUND OF THE INVENTION

EP-A-0111976 and EP-A-0112592 relate to zwitterionic polymers which are for example obtained by alkoxylation of polyalkyleneamines such as triethylenetetramine or tetraethylenepentamine or of polyethyleneimines, sulfonation of the alkoxylated products and subsequent quaternization. These zwitterionic products have clay-soil removal and anti-redeposition properties when used in detergent compositions, however their effectiveness in dispersing and removing clay embedded in the fabric into the laundry liquor is not sufficient. Furthermore it was found, that preferred embodiments of the above mentioned patents show thermal instability.

U.S. Pat. No. 4,739,094 discloses alkoxylated aminopolyethers containing units of ethylene oxide and propylene oxide and having a molecular weight of from 10,000 to 150,000. The alkoxylated aminopolyethers are water-soluble and are used in 5 to 60% strength by weight aqueous solution in the preparation of coal/water slurries. If appropriate, the alkoxylated aminopolyethers can also be reacted with carboxylic acid anhydrides, amidosulfonic acids and urea, acid chlorides of sulfur or of phosphorus or chloroacetic acid esters. The reaction products can be converted into ionic compounds by subsequent neutralization or hydrolysis.

In the course of optimizing modern laundry detergents there is a need to improve properties of clay soil removal agents for better effectiveness in the wash liquour, improved synergy with the surfactant system and for better thermal stability during processing and storing.

It is therefore an object of the invention to provide new polymers with improved thermal stability.

SUMMARY OF THE INVENTION

The above object is achieved with a zwitterionic polyetherpolyamine comprising a linear or branched polyetherpolyamine backbone having 2 to 10 tertiary amino nitrogen atoms and a molecular weight of from 100 to 800, at least one tertiary amine end group of the polyetherpolyamine backbone contains at least two groups having the formula

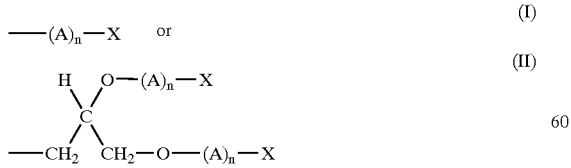

wherein
A means an ethylene oxide unit, a propylene oxide unit, a unit of butylene oxides and a tetrahydrofuran unit,
n is a number of from 1 to 50, X is —SO$_3$M, —CH$_2$—CH$_2$—SO$_3$M,
—CH$_2$—CH$_2$—CH$_2$—SO$_3$M,

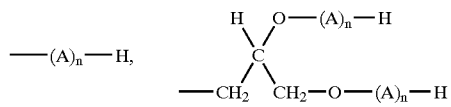

—CH$_2$—CH$_2$—COOM,    —PO$_3$M$_2$,
—CH$_2$—CH$_2$—PO$_3$M$_2$, with the proviso that in formula II one X may also be hydrogen and M is hydrogen, alkali metal or ammonium,
or contains one group of formula I or II and one group selected from radicals consisting of

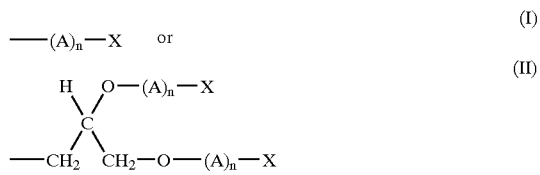

$C_1$- to $C_{22}$-alkyl and $C_7$- to $c_{22}$-aralkyl, the meaning of A and n is the same as in formula I or II, said zwitterionic polyetherpolyamine having a molecular weight up to 9,000 and optionally containing up to 100% of the nitrogen atoms quaternized.

The object is also achieved with a process for the production of a zwitterionic polyetherpolyamine which comprises a first step wherein
(i) a linear or branched polyetherpolyamine having a molecular weight of from 100 to 800, 2 to 10 nitrogen atoms and containing at least 2 primary or secondary amino nitrogen end groups or the reaction product of said polyetherpolyamine with up to 1 glycidol per NH group of the polyetherpolyamine is reacted with
(ii) at least one $C_2$- to $C_4$-alkylene oxide or tetrahydrofuran at such a ratio that on each NH group of the polyetherpolyamine 1 to 50 units of the alkylene oxide are added, a second step wherein the alkoxylated polyetherpolyamine obtained in the first step is reacted with a compound selected from the group consisting of a halogen sulfonic acid, halogen phosphorous acid, vinyl sulfonic acid, propane sultone, halogen acetic acid, acrylic acid, methacrylic acid, vinyl phosphorous acid and the alkali metal or ammonium salts of the said acids, in such a manner that at least one tertiary amine end group of the alkoxylated polyetherpolyamine contains two groups having the formula —(A)$_n$—X    or    (I)

(II)

wherein
A means an ethylene oxide unit, a propylene oxide unit, a unit of butylene oxides and a tetrahydrofuran unit,
n is a number of from 1 to 50, X is 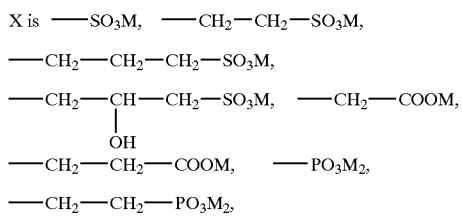

with the proviso that in formula II one X may also be hydrogen and

M is hydrogen, alkali metal or ammonium,
or contains one group of formula I or II and one group selected from radicals consisting of

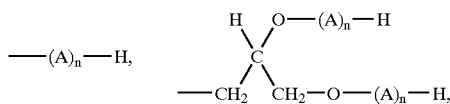

$C_1$- to $C_{22}$-alkyl and $C_7$- to $C_{22}$-aralkyl, the meaning of A and n is the same as in formula I or II, and optionally a third step wherein up to 100% of the tertiary nitrogen atoms of the reaction product obtained in the second step are quaternized, said degree of quaternization may also be obtained by first quaternizing the reaction product obtained in the first step and subsequently carrying out the second step.

Preferred zwitterionic polyetherpolyamines contain two groups of formula I or II attached to the tertiary nitrogen atoms of the end groups of the polyetherpolyamine backbone. Especially preferred zwitterionic polyetherpolyamines contain the nitrogen atoms of the end groups of the polyetherpolyamine backbone quaternized and, as substituents, two groups of formula I or II and one C1 to C22 alkyl group.

The substituent A in formulae I and II may have the following structures:

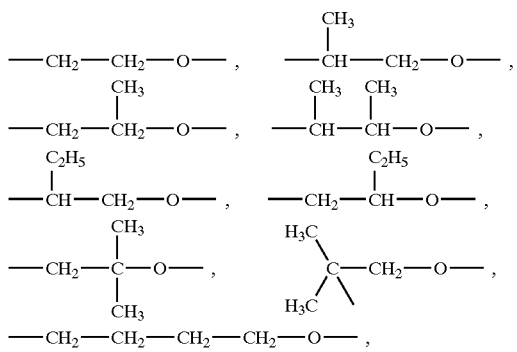

Of particular interest are such zwitterionic polyetherpolyamines, wherein the nitrogen atoms of the end groups of the polyetherpolyamine backbone are quaternized and contain, as substituents, two groups of formula I and a C1 to C22 alkyl group. Other zwitterionic polyetherpolyamines which are of particular interest are those wherein the nitrogen atoms of the end groups of the polyetherpolyamine backbone are quaternized and contain, as substituents, two groups of formula I and a hydroxyethyl or a hydroxypropyl group.

The polyetherpolyamine backbone of the zwitterionic polyetherpolyamines can be linear or branched and contains 2 to 10, preferably 2 to 6 and most preferably 2 to 4 tertiary nitrogen atoms and has a molecular weight without pending group of from 100 to 800, preferably 120 to 500. The polyetherpolyamine backbone can be described by the following formulae. The polyetherpolyamine backbone without the nitrogen end groups comprises, for instance, units having the formula

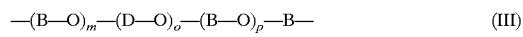 (III)

wherein

B is a linear or branched $C_2$- to $C_4$-alkylene

D is a linear, branched or cyclic $C_5$- to $C_{16}$-alkylene, $C_4$- to $C_{16}$-oxaalkylene or $C_5$- to $C_{16}$-azaalkylen, m is 0–7, o is 0 or 1, p is 0–6, with the proviso that m+o+p≧1 up to 9.

The polyetherpolyamine backbone of formula III is derived from diamines having the formula

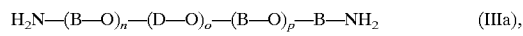 (IIIa), wherein the symbols have the same meaning as in formula III.

Examples of compounds of the above formula IIIa are hydrogenated cyanomethylated C3- to C12-diols. These compounds are obtained by reacting first a diol with formaldehyde and hydrogencyanide and subsequently hydrogenating the addition product in the presence of ammonia. This method of producing amines is hereinafter referred to as aminoethylation. Compounds so produced are especially 1,9-diamino-3,7-dioxa-nonane, 1,10-diamino-3,8-dioxadecane, 1,12-diamino-3,10-dodecane and 1,14-diamino-3,12-tetradecane.

Other compounds of formula IIIa are α,ω-diamino polyalkyleneglycols which are obtained by hydrogenation of cyanomethylated polyalkylene glycols (aminoethylation). Suitable polyalkylene glycols contain preferably 2 to 10 repeating units and are derived from polyethylene glycol, polypropylene glycol, polybutylene glycol and polytetrahydrofurane. The polyalkylene glycols may contain the repeating units in statistical distribution or as blocks. Examples of such compounds are 1,5-diamino-3-oxapentane, 1,8-diamino-3,6-dioxa-octane, 1,11-diamino-3,6,9-trioxa-undecane, 1,5-diamino-1,4-dimethyl-3-oxa-heptane, 1,8-diamino-1,4,7-trimethyl-3,6-dioxadecane, 1,9-diamino-5-oxa-nonane and 1,14-diamino-5,10-dioxa-tridecane.

Further compounds of formula IIIa are hydrogenated cyanoethylated $C_2$- to $C_{12}$-diols which are obtained by reacting a diol with acrylonitrile in a molar ratio of about 1 to 2 in a Michael type addition reaction and hydrogenating the Michael addition product thus obtained in the presence of ammonia. This method of producing amines is hereinafter referred to as aminopropylation. Examples of such compounds are 1,10-diamino-4,7-dioxa-decane, 1,10-diamino-5-methyl-4,7-dioxa-undecane, 1,11-diamino-6,6-dimethyl-4,8-dioxa-tridecane, 1,12-diamino-4,9-dodecane and 1,14-diamino-4,11-tetradecane.

Another group of compounds of formula IIIa are hydrogenated cyanoethylated polyalkylene glycols having 2 to 10 repeating units. These compounds are obtained by reacting a polyalkylene glycol with acrylonitrile according to a Michael addition to acrylonitrile in a molar ratio of 1 to 2 and hydrogenating the addition products (aminopropylation). Suitable polyalkylene glycols are specified above. Examples of compounds of this group are 1,13-diamino-4,7,10-trioxa-tridecane, 1,13-diamino-5,8-dimethyl-4,7,10-trioxa-undecane, 1,16-diamino-4,7,10,13- tetraoxa-hexadecane, 1,16-diamino-5,8,11-trimethyl-4,7,10,13-tetraoxa-hexadecane and 1,17-diamino-4,9,14-trioxa-heptadecane.

Other suitable amines of this type are obtained by amination of polyethylene glycol, polypropylene glycol or polytetrahydrofurane containing blockcopolymers containing 7 to 10 ethylene oxide units and 2 to 5 propylene oxide units, i.e. reaction of ammonia with said blockcopolymers under exchange of the OH end groups of the blockcopolymers by a $NH_2$ groups.

Preferred diamines IIIa are the aminoethylated and aminopropylated diols and polyalkylene glycols. Most preferred are the aminopropylated diols and polyalkylene glycols.

If aminoethylated, aminopropylated or aminated polyalkylene glycols are used polyethylene glycole and polyethylene glycole reacted at the endgroups with 1–2 moles propylene oxide or butylene oxide or poly-tetrahydrofuran are preferred. The preferred total number of alkylene oxide units within these polyalkylene glycols is of from 3 to 9 most preferred from 3 to 6.

The polyetherpolyamine backbone without the nitrogen end may consist of units having the formula

  (IV)

wherein
B is a linear or branched $C_2$- to $C_4$-alkylene,
E is

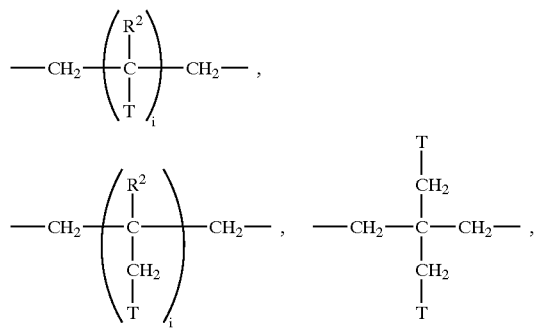

$R^2$ is —H, $C_1$- to $C_6$-alkyl,
T is

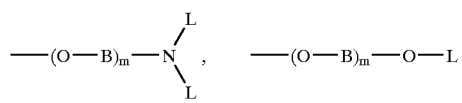

L is a group of formula I or II,

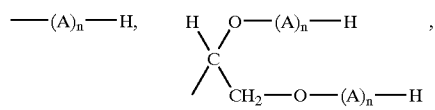

and
i is 1–4,
m is 0–7.

The polyetherpolyamine backbone of formula IV is derived from branched structures which can be obtained from polyols having 3 to 6 hydroxy groups such as glycerol, trimethylolmethane, trimethylolethane, trimethylolpropane, pentaerythritol, sorbit and mannit, by alkoxylation with 1 to 4 molecules of ethylene oxide, propylene oxide, butylene oxide or their mixtures per OH group in the polyol and subsequent reaction with ammonia in order to convert the OH groups into NH groups. Other methods of producing amines having a spacer of formula IV consist either in aminomethylation or aminopropylation of the above polyols with 3 to 6 hydroxy groups.

Examples of such compounds are the aminated reaction products of 1 mole of glycerol with 3 to 7 moles of ethylene oxide, aminated block copolymers obtained by reacting 1 mole of glycerol with 3 moles of propylene oxide and subsequently with 7 moles of ethylene oxide, aminated reaction products of 1 mole of trimethylolpropane with 3 to 7 moles of ethylene oxide, aminated reaction products of block copolymers obtained by reacting 1 mole of trimethylolpropane with 3 moles of propylene oxide and further with 7 moles of ethylene oxide, aminated reaction products of an ethoxylated pentaerythrit containing 4 to 8 ethylene oxide units and aminated reaction products of an alkoxylated pentaerythrit containing blocks of 4 propylene oxide units and 8 ethylene oxide units. Of specific interest is an aminated propoxylated trimethylolpropane containing 9 propylene oxide units.

Preferred polyetherpolyamines derived from backbones of formula IV are those obtained from glycerol, trimethylolpropane and pentaerythrit. Especially preferred are those obtained by aminopropylation.

The polyetherpolyamine backbone without the nitrogen end groups may also be characterized by units having the formula

  (V)

wherein
E is

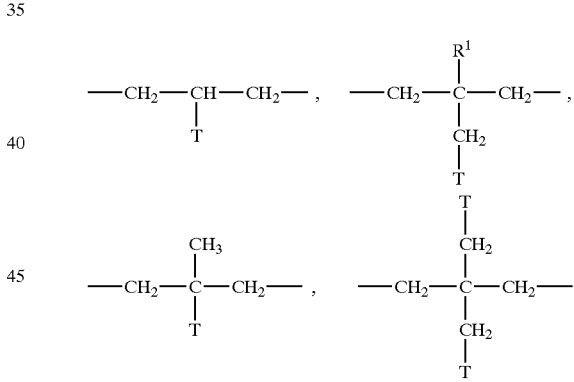

T is

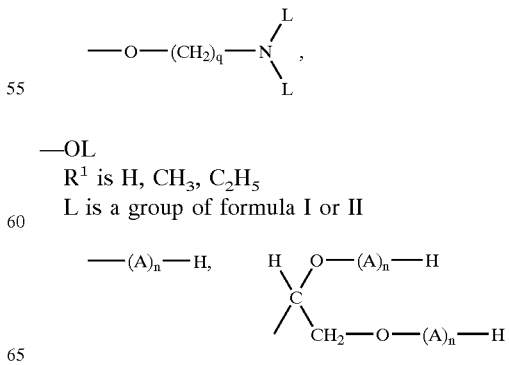

—OL
$R^1$ is H, $CH_3$, $C_2H_5$
L is a group of formula I or II

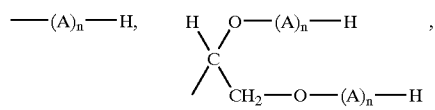

and
q is 2 or 3.

Preferred amines containing the spacer of formula V are the reaction products obtained by aminoethylation of glycerol, trimethylolpropane or pentaerythrit or the aminopropylated reaction products of the said alcohols with the proviso that all OH groups of the polyols are aminoethylated or aminopropylated respectively.

Suitable polyetherpolyamines for producing zwitterionic polyetherpolyamines with polyetherpolyamine backbone having more than 2 tertiary amino nitrogen atoms may for instance have the following formulae

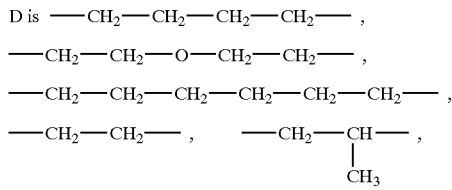

x = 1–8    y = 1–5

Another description for the polyetherpolyamine backbone without the nitrogen end groups may be given by units having the formula $$-(CH_2)_q-O-D-O-(CH_2)_q- \quad (VI)$$

wherein

D is —CH$_2$—CH$_2$—CH$_2$—CH$_2$— ,

—CH$_2$—CH$_2$—O—CH$_2$—CH$_2$— ,

—CH$_2$—CH$_2$—CH$_2$—CH$_2$—CH$_2$—CH$_2$— ,

—CH$_2$—CH$_2$— ,    —CH$_2$—CH— ,
                            |
                            CH$_3$ q is 2 or 3.

Preferred amines containing the spacer of formula VI are bis(aminoethylated) or bis(aminopropylated) alcohols selected from the group consisting of ethylene glycol, propylene glycol, butanediol-1,4, hexanediol-1,6 and diethylene glycol.

Preferred zwitterionic polyetherpolyamine may have the formula (VII)

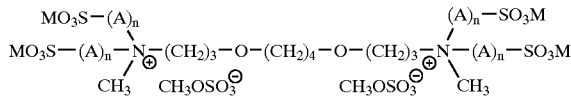

wherein

A is —CH$_2$—CH$_2$—O— ,   —CH—CH$_2$—O— ,
                                  |
                                  CH$_3$

—CH$_2$—CH—O— ,
        |
        CH$_3$

M is H, Na, K, ammonium and
n is 15–25.

The compounds of formula VII contain as spacer between the nitrogen end groups a bis(aminopropylated) butanediol-1,4 which is especially preferred.

Especially preferred zwitterionic polyetherpolyamines are those having the formula (VIII)

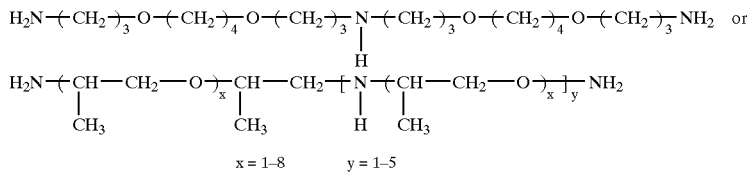

wherein
EO is —CH$_2$—CH$_2$—O—
M is H, Na, K or ammonium and
n is 15–25.

The weight average molecular weight Mw of the zwitterionic polyetherpolyamines is up to 9,000, preferably of from 1,500 to 7,500 and more preferably of from 2,000 to 6,000. The zwitterionic polyetherpolyamines can be soluble or dispersible in water and aqueous or nonaqueous solvents or formulations. In one preferred embodiment of the present invention they are water soluble. These water-soluble zwitterionic polyetherpolyamines are used in laundry detergent compositions and have an excellent degree of clay soil removal from fabrics.

The zwitterionic polyetherpolyamines are net anionic. Preferably the average number of anionic charges resulting from groups X exceeds the average number of cationic charges resulting from protonated or quaternized amine groups by a factor of more than 1.2, more preferred of more than 1.5, most preferred of more than 1.8.

The zwitterionic polyetherpolyamines of the invention are prepared in a multistage process. In the first step of this process a linear or branched polyetherpolyamine having a molecular weight of from 100 to 800, 2 to 10 nitrogen atoms and containing at least 2 primary or secondary amino nitrogen end groups is reacted with at least one C2- to C4-alkylene oxide or tetrahydrofurane at such a ratio that on each NH group of the polyetherpolyamine 1 to 50, preferably 15 to 25 alkylene oxide units are added. Ethylene oxide and propylene oxide are the preferred alkoxylating agents. If a mixture of alkylene oxides is added to the amino nitrogen then the polymerized alkylene oxides may be present in statistical distribution or as blocks. For example one can add first 10 to 20 of ethylene oxide units per NH group in the polyetherpolyamine and then add 5 to 10 propylene oxide units or vice versa.

Most preferred ethylene oxide alone or a combination of 1–15% propylene oxide or 1–10% butylene oxide with 85–99, 90–99% ethylene oxide respectively are used. If a combination of ethylene oxide and propylene oxide or butylene oxide is used preferrably the propylene oxide or butylene oxide is reacted first with the NH and OH-groups of the polyetherpolyamine and the ethylene oxide is added after that.

The above described procedure gives polyalkoxylated products which have groups of formula —(A)$_n$—H, wherein A and n have the meaning given for formula I.

The linear or branched polyetherpolyamines are preferably ethoxylated in the first step of the production of the zwitterionic polyetherpolyamines.

In order to produce zwitterionic polyetherpolyamines having end groups of formula II a linear or branched polyetherpolyamine having a molecular weight of from 100 to 800, 2 to 10 nitrogen atoms, containing at least 2 primary or secondary amino nitrogen groups and having up to 1 glycidol unit added per NH group is in the first step of the process according to the invention alkoxylated at the OH groups and remaining NH groups as described above. The amines containing between the nitrogen end groups the spacer having the formula III to VI can, for example, be reacted with up to one molecule of glycidol per NH group of the polyetherpolyamines. The reaction of glycidol with said polyetherpolyamine may be carried out to such an extent that at least 50 to 100% of the NH groups of the polyetherpolyamine are substituted by one glycidol unit.

In the second step of the production of the zwitterionic polyetherpolyamines an anionic group is introduced into the alkoxylated polyetherpolyamines obtained in the first step. This may be achieved by reacting the alkoxylated polyetherpolyamines in a Michael type addition reaction with acrylic acid, methacrylic acid, vinyl sulfonic acid, vinylphosphonic acid or their alkalimetal or ammonium salts or by reacting them with halogen sulfonic acid, halogen phosphorous acid, propane sultone or halogen acetic acid. The preferred component for introducing anionic groups is chlorosulfonic acid.

Dependent on the amount of anionic agent used in the second step zwitterionic products are obtained which contain either two substituents of formula I or II or contain only one of them, if, for instance, only one mole of the anionic agent is used per one mole of OH end group of the alkoxylated polyetherpolyamine. The non-reacted end groups of the alkoxylated polyetherpolyamine may be characterized by a group selected from radicals consisting of

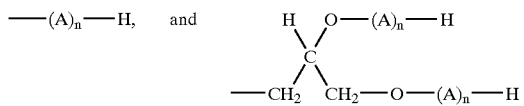

the meaning of A and n is the same as in formula I or II.

The degree of substitution of the OH groups in the alkoxylated polyether polyamines is such, that the finally resulting zwitterionic polyetherpolyamine is net anionic at the pH of intended use; e.g. from 40% up to 100% of the OH group are substituted by an anionic group. Preferably more than 60%, more preferred more then 80%, most preferred 90–100% of the OH-groups are substituted by an anionic group.

Moreover the zwitterionic polyetherpolyamines may also contain only one substituent of formula I or II and instead of the above described radicals a $C_1$–$C_{22}$-alkyl group or a $C_7$- to $C_{22}$-aralkyl group. Such compounds result when the polyetherpolyamine used in the first step contains secondary amino groups having a $C_1$- to $C_{22}$-alkyl or a $C_7$- to $C_{22}$-aralkyl substituent.

The zwitterionic polyetherpolyamines obtained in the second step may optionally be reacted in a third step with a quaternizing agent. Alternatively, quaternized products may also be obtained by first quaternizing the reaction products obtained in the first step, i.e. the polyalkoxylated polyetherpolyamines. Suitable quaternization agents are for example $C_1$- to $C_{22}$-alkylhalides, $C_7$- to C22-aralkyl halides $C_1$–$C_2$- dialkylsulfates or alkylene oxides. Examples of quaternizing agents are dimethyl sulfate, diethyl sulfate, methylchloride, ethyl chloride, methyl bromide, ethyl bromide, butyl bromide, hexyl chloride, benzyl chloride, benzyl bromide, ethylene oxide or propylene oxide. Dialkylsulfates, $C_1$–$C_4$-alkylchlorides and benzoylchloride are preferred. Dimethyl sulfate is the most preferred quaternizing agent. Up to 100% of the tertiary nitrogen atoms of the zwitterionic polyetherpolyamine may be quaternized. If there is a quaternization step, then the degree of quaternization is, for example, 10 to 100%, preferably at least 25% and more preferably 75 to 100%.

According to a preferred embodiment of the process for the production of zwitterionic polyetherpolyamines in the first step (i) a linear or branched polyetherpolymine having a molecular weight of from 120 to 750, 2 to 4 nitrogen atoms and containing 2 to 4 primary or secondary amino nitrogen end groups is reacted with (ii) an alkylene oxide selected from the group consisting of ethylene oxide, propylene oxide, butylene oxide and mixtures of the said alkylene oxides, at such a ratio that on each NH group of the polyetherpolyamine 15 to 40 units of the alkylene oxide are added, in the second step the alkoxylated polyetherpolyamine obtained in the first step is reacted with chlorosulfonic acid in such ratio that at least one teritary end group of the polyetherpolyamine contains two groups having the formula $$—(A)_n—X \qquad (I),$$

wherein

A is an ethylene oxide unit, a propylene oxide unit or a butylene oxide unit, n is 15–40 and X is $SO_3H$, and in the third step the zwittreionic reaction product of the second step is quaternized with dimethyl sulfate, methyl chloride or benzyl chloride.

The quaternization can also be carried out as a second step in the multistage process for the production of zwitterionic polyetherpolyamines. The alkoxylated polyetherpolyamine obtained in the first step is quaternized up to 100% and subsequently reacted with chlorosulfonic acid or another agent capable to introduce an anionic group. This procedure is preferred for the production of quaternized zwitterionic polyetherpolyamines.

The zwitterionic polyetherpolyamines are used as additive in laundry detergent compositions which provide enhanced hydrophilic soil, inter alia, clay, removal benefits. The new zwitterionic polyetherpolyamines are especially useful in detergents comprising a surfactant system which comprises mid-chain branched surfactants inter alia mid-chain branched alkyl sulphonates. The zwitterionic polyetherpolyamines are additionally used as effective dispersants for hydrophilic particles within aqueous and nonaqueous solutions and formulations.

The degree of quaternization and of sulfation was determined by $^1$H-NMR. The amine number was determined by amine titration according to DIN 16 945.

EXAMPLE 1 a) Ethoxylation of 1,12-diamino-4,9-dioxa-dodecan ("DODD")

204.3 g (1 mole) of 1,12-diamino-4,9-dioxa-dodecan and 12.3 g of water were placed in a pressurizable 5 l autoclave fitted with a stirrer. The autoclave was sealed and three times pressurized with nitrogen at 5 bar. The pressure was released and thereafter the autoclave sealed pressure-tight. The contents of the autoclave were heated while stirring to 110° C. At this temperature 180.4 g (4.1 moles) of ethylene oxide were added continuously while maintaining the temperature between 110–120° C. and the maximum pressure up to 5 bar. The reaction mixture was stirred until the pressure was constant and then cooled to about 80° C. The pressure was then released, the autoclave three times pressurized with nitrogen at 5 bar and 11.5 g of a 50% strenght by weight sodium hydroxide solution were added.

The autoclave was then sealed and vacuum continuously applied to remove the water. The contents of the reactor were heated for four hours at 120° C. and at a pressure of 10 mbar.

Vacuum was removed with nitrogen and the autoclave heated to 140° C. Between 140 and 150° C. 3,344 g (76 moles) of ethylene oxide were continuously introduced into the autoclave while stirring. The maximum pressure was 10 bar. The reaction mixture was stirred until the pressure was constant. The contents of the reactor were then cooled to 80° C. and the reactor three times pressurized with nitrogen at 5 bar. 3,735 g of a reaction product having a viscosity of 313 mPas at 50° C. was obtained which was an ethoxylated 1,12-diamino-4,9-dodecan containing 20 ethylene oxide units per NH group of the polyetherpolyamine ("DODD EO20").

b) Quaternization of the Reaction Product Obtained According to (a)

Into a weighed, 2000 ml, 3 neck round bottom flask fitted with argon inlet, condenser, addition funnel, thermometer, mechanical stirring and argon outlet (connected to a bubber) is added DODD EO20 (561,2 g, 0,295 mol N, 98% active, m.w.–3724) and methylene chloride (1000 g) under argon. The mixture is stirred at room temperature until the polymer has dissolved. The mixture is then cooled on 5° C. using an ice bath. Dimethyl sulfate (39,5 g, 0,31 mol, 99% m.w.–126,13) is slowly added using an addition funnel over a period of 15 minutes. The ice bath is removed and the reaction is allowed to rise to room temperature. After 48 hrs. the reaction is complete. The degree of quaternization was 90% (determinde by $^1$-NMR).

c) Sulfation of the Reaction Product Obtained According (b)

Sulfation of 4,9-dioxa-1,12-dodecanediamine which is quaternized to about 90% of the backbone nitrogens of the product admixture and which is ethoxylated to an average of 20 ethoxylations per backbone NH unit under argon, the reaction mixture from the quaternization step is cooled to 5° C. using an ice bath (DODD EO20, 90+mol-%, quat., 0,59 mol OH). Chlorosulfonic acid (72 g, 0,61 mol, 99% m.w.–116.52) is slowly added using an addition funnel. The temperature of the reaction mixture is not allowed to rise above 10° C. The ice bath is removed and the reaction is allowed to rise to room temperature. After 6 hrs. the reaction is complete. The reaction is again cooled to 5° C. and sodium methoxide (264 g, 1,22 mol, Aldrich, 25% in methanol, m.w.–52.02) is slowly added to the rapidly stirred mixture. The temperature of the reaction mixture is not allowed to rise above 10° C. The reaction mixture is transferred to a single neck round bottom flask. Purified water (1300 mol) is added to the reaction mixture and the methylene chloride, methanol and some water is stripped off on a rotary evaporator at 50° C. The clear, light yellow solution is transferred to a bottle for storage. The final product pH is checked and adjusted to ~9 using 1N NaOH or 1N HCl as needed. Final weight ~1753 g, degree of sulfatation was 90% (determined by $^1$H-NMR).

EXAMPLES 2–12

According to the procedure given in Example 1 (a) the following amines amine 1: 4,9-dioxadodecanediamine-1,12 amine 2: 4,7,19-trioxatridecane-diamine-1,13 amine 3: α,ω-diamino polypropylene glycol (average degree of polymerization Pn=3)

amine 4: α,ω-diamino polypropylene glycol (average degree of polymerization Pn=6)

amine 5: end group aminated blockcopolymer of polyethylene glycol and propylene glycol (Jeffamine T-403)

amine 6: end group aminated propoxylated trimethylolpropane (Jeffamine XTJ)

amine 7: N,N,N',N'-tetrakis(2,3-dihydroxypropyl)-4,9-dioxadodecanediamine (reaction product of 1 mole of 4,9-dioxadodecanediamine-1,12 with 4 moles of glycidol)

were reacted with the alkxylene oxides specified in Table 1. The alkoxylated amines thus obtained had the viscositiy and the amine number given in Table 1.

The alkoxylated amines were then—with the exception of Examples 4, 6 and 12—quaternized as described in Example 1 (b) and subsequently sulfated according to the procedure of Example 1 (c). The amounts of dimethylsulfate and chlorsulfonic acid were so adjusted that the degree of quaternization and sulfatation given in Table 1 was achieved.

TABLE 1

| Example | Amine No. | Moles of alkylene oxide added per mole of NH groups in amine | Viscosity mPas at 50° C. | Amine* number | % quaternization | % sulfation |
|---|---|---|---|---|---|---|
| 2 | 1 | 20 EO | 229 | 52.4 | 90 | 90 |
| 3 | 1 | 24 EO | 486 | 26.9 | 90 | 90 |
| 4 | 1 | 20 EO | | 32.5 | 0 | 90 |
| 5 | 1 | 20 EO | | 32.5 | 90 | 50 |
| 6 | 1 | 3 PO + 17 EO | | 30.6 | 0 | 90 |
| 7 | 2 | 20 EO | 305 | 32.6 | 90 | 90 |
| 8 | 3 | 20 EO | | 32.1 | 90 | 90 |
| 9 | 4 | 20 EO | | 32.1 | 90 | 90 |
| 10 | 5 | 20 EO | | 33.5 | 90 | 90 |

TABLE 1-continued

| Example | Amine No. | Moles of alkylene oxide added per mole of NH groups in amine | Viscosity mPas at 50° C. | Amine* number | % quaternization | % sulfation |
|---|---|---|---|---|---|---|
| 11 | 6 | 20 EO | | 30.8 | 90 | 90 |
| 12 | 7 | 38 EO | | 20.1 | 0 | 90 |

EO: ethylene oxide
PO: propylene oxide
*Amine number of the alkylene oxide addition product measured according to DIN 16945

What is claimed is:

1. A zwitterionic polyetherpolyamine comprising a linear or branched polyetherpolyamine backbone having 2 to 10 tertiary amino nitrogen atoms and a molecular weight of from 100 to 800, at least one tertiary amine end group of the polyether-polyamine backbone contains two groups having the formula

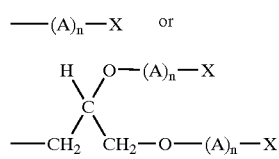

wherein
A means an ethylene oxide unit, a propylene oxide unit, a unit of butylene oxides and a tetrahydrofuran unit,
n is a number of from 1 to 50,
X is $-SO_3M$, $-CH_2-CH_2-SO_3M$, $-CH_2-CH_2-CH_2-SO_3M$, $-CH_2-CH-CH_2-SO_3M$,

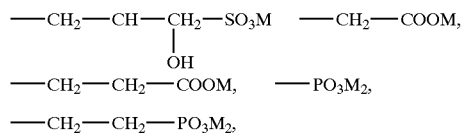

with the proviso that in formula II one X may also be hydrogen and
M is hydrogen, alkali metal or ammonium,
or contains one group of formula I or II and one group selected from radicals consisting of

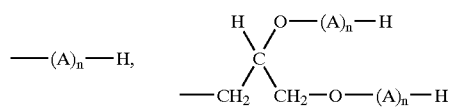

$C_1$- to $C_{22}$-alkyl and $C_7$- to $C_{22}$-aralkyl, the meaning of A and n is the same as in formula I or II,
said zwitterionic polyetherpolyamine having a molecular weight up to 9,000 and containing from 25 to 1000 of the nitrogen atoms quaternized.

2. A zwitterionic polyetherpolyamine as claimed in claim 1, wherein the tertiary nitrogen atoms of the end groups of the polyetherpolyamine backbone contain two groups of formula I or II.

3. A zwitterionic polyetherpolyamine as claimed in claim 1, wherein the nitrogen atoms of the end groups of the polyetherpolyamine backbone are quaternized and contain, as substituents, two groups of formula I or II and one $C_1$- to $C_{22}$-alkyl group or a hydroxyalkyl group.

4. A zwitterionic polyetherpolyamine as claimed in claim 1, wherein the nitrogen atoms of the end groups of the polyetherpolyamine backbone are quaternized and contain, as substituents, two groups of formula I and a $C_1$- to $C_{22}$-alkyl group.

5. A zwitterionic polyetherpolyamine as claimed in claim 1, wherein the nitrogen atoms of the end groups of the polyetherpolyamine backbone are quaternized and contain, as substituents, two groups of formula I and a hydroxyethyl or in hydroxypropyl group.

6. A zwitterionic polyetherpolyamine as claimed in claim 1, wherein the polyetherpolyamine backbone without the nitrogen end groups comprises units having the formula

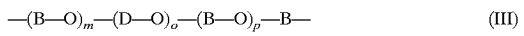

wherein
B is a linear or branched $C_2$- to $C_4$-alkylene
D is a linear, branched or cyclic $C_5$- to $C_{16}$-alkylene, $C_4$- to $C_{16}$-oxaalkylene or $C_5$- to $C_{16}$-azaalkylen,
m is 0-7,
o is 0 or 1,
p is 0–6, with the proviso that m+o+p≧1 up to 9.

7. A zwitterionic polyetherpolyamine as claimed in claim 1, wherein the polyetherpolyamine backbone without the nitrogen end groups comprises units having the formula

wherein
B is a linear or branched $C_2$- to $C_4$-alkylene,

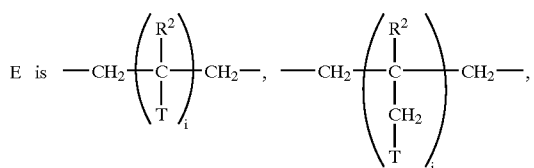

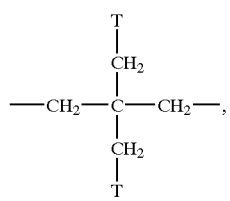

$R^2$ is —H, $C_1$- to $C_6$-alkyl, $$T \text{ is } -(O-B)_m-N\begin{matrix}L\\ \\L\end{matrix}, \quad -(O-B)_m-L,$$

L is a radical selected from the group consisting of formula I, formula II, $$-(A)_n-H, \text{ and } \quad -CH_2\begin{matrix}H&O-(A)_n-H\\ \diagdown/\\C\\ \diagup\diagdown\\ &CH_2-O-(A)_n-H\end{matrix}$$

the meaning of A and n is the same as in formula I or II,
i is 1–4,
m is 0–7.

8. A zwitterionic polyetherpolyamine as claimed in claim 1, wherein the polyetherpolyamine backbone without the nitrogen end groups comprises units having the formula $$-(CH_2)_q-O-E-O-(CH_2)_q- \qquad (V)$$

wherein $$E \text{ is } -CH_2-CH-CH_2-, \quad -CH_2-\underset{\underset{T}{|}}{\overset{\overset{R^1}{|}}{C}}-CH_2-,$$

$$-CH_2-\underset{\underset{T}{|}}{\overset{\overset{CH_3}{|}}{C}}-CH_2-, \quad -CH_2-\underset{\underset{CH_2}{|}\atop\underset{T}{|}}{\overset{\overset{CH_2}{|}\atop\overset{T}{|}}{C}}-CH_2-,$$

$$T \text{ is } -O-(CH_2)_q-N\begin{matrix}L\\ \\L\end{matrix}, \quad -OL,$$

$R^1$ is H, $CH_3$, $C_2H_5$
L is a group of formula I or II $$-(A)_n-H, \quad -CH_2\begin{matrix}H&O-(A)_n-H\\ \diagdown/\\C\\ \diagup\diagdown\\ &CH_2-O-(A)_n-H\end{matrix}$$

and
q is 2 or 3.

9. A zwitterionic polyetherpolyamine as claimed in claim 1, wherein the polyetherpolyamine backbone without the nitrogen end groups comprises units having the formula $$-(CH_2)_q-O-D-O-(CH_2)_q- \qquad (VI)$$

wherein

D is  $-CH_2-CH_2-CH_2-CH_2-$, $-CH_2-CH_2-O-CH_2-CH_2-$, $-CH_2-CH_2-CH_2-CH_2-CH_2-CH_2-$, $-CH_2-CH_2-$, $\quad -CH_2-CH-$,
$\qquad\qquad\qquad\qquad\quad\;\;\,|$
$\qquad\qquad\qquad\qquad\;\;\,CH_3$ q is 2 or 3.

10. A zwitterionic polyetherpolyamine as claimed in claim 1, having the formula (VII)

$$\begin{matrix}MO_3S-(A)_n & & & & (A)_n-SO_3M\\ \diagdown & & & & \diagup\\ MO_3S-(A)_n-\overset{\oplus}{N}-(CH_2)_3-O-(CH_2)_4-O-(CH_2)_3-\overset{\oplus}{N}-(A)_n-SO_3M\\ \diagup\quad & & & & \diagdown\\ CH_3\;CH_3OSO_3^\ominus & & CH_3OSO_3^\ominus & & CH_3\end{matrix}$$

wherein

A is  $-CH_2-CH_2-O-$,  $-CH-CH_2-O-$,
$\qquad\qquad\qquad\qquad\qquad\quad\;|$
$\qquad\qquad\qquad\qquad\;\;CH_3$ $-CH_2-CH-O-$,
$\qquad\;\;\;|$
$\quad\;\;CH_3$ M is H, Na, K, ammonium and
n is 15–25.

11. A zwitterionic polyetherpolyamine as claimed in claim 1, having the formula (VIII)

$$\begin{matrix}MO_3S-(EO)_n & & & & (EO)_n-SO_3M\\ \diagdown & & & & \diagup\\ MO_3S-(EO)_n-\overset{\oplus}{N}-(CH_2)_3-O-(CH_2)_4-O-(CH_2)_3-\overset{\oplus}{N}-(EO)_n-SO_3M\\ \diagup\quad & & & & \diagdown\\ CH_3\;CH_3OSO_3^\ominus & & CH_3OSO_3^\ominus & & CH_3\end{matrix}$$

wherein
EO is —CH$_2$—CH$_2$—O—
M is H, Na, K or ammonium and
n is 15–25.

12. A process for the production of a zwitterionic polyetherpolyamine which comprises a first step wherein
   (i) a linear or branched polyetherpolyamine having a molecular weight of from 100 to 800, 2 to 10 nitrogen atoms and containing at least 2 primary or secondary amino nitrogen end groups or the reaction product of said polyetherpolyamine with up to 1 glycidol per NH group of the polyetherpolyamine is reacted with
   (ii) at least one C$_2$- to C$_4$-alkylene oxide or tetrahydrofurane at such a ratio that on each NH group of the poly-etherpolyamine 1 to 50 units of the alkylene oxide are added,
a second step wherein the alkoxylated polyetherpolyamine obtained in the first step is reacted with a compound selected from the group consisting of a halogen sulfonic acid, halogen phosphorous acid, vinyl sulfonic acid, propane sultone, halogen acetic acid, acrylic acid, methacrylic acid, vinyl phosphorous acid and the alkali metal or ammonium salts of the said acids, in such a manner that at least one tertiary amine end group of the alkoxylated polyetherpolyamine contains two groups having the formula

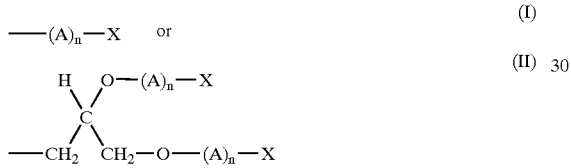

wherein
A means an ethylene oxide unit, a propylene oxide unit, a unit of butylene oxides and a tetrahydrofuran unit,
n is a number of from 1 to 50,
X is —SO$_3$M, —CH$_2$—CH$_2$—SO$_3$M, —CH$_2$—CH$_2$—CH$_2$—SO$_3$M, —CH$_2$—CH—CH$_2$=SO$_3$M, X is ——SO$_3$M, ——CH$_2$—CH$_2$—SO$_3$M,

——CH$_2$——CH$_2$—CH$_2$—SO$_3$M,

——CH$_2$——CH——CH$_2$—SO$_3$M,   ——CH$_2$——COOM,
              |
              OH
——CH$_2$——CH$_2$——COOM,   ——PO$_3$M$_2$,

——CH$_2$——CH$_2$——PO$_3$M$_2$, with the proviso that in formula II one X may also be hydro-gen and
M is hydrogen, alkali metal or ammonium, or contains one group of formula I or II and one group selected from radicals consisting of

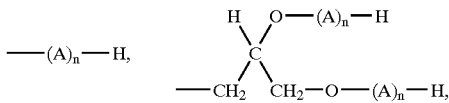

C$_1$- to C$_{22}$-alkyl and C$_7$- to C$_{22}$-aralkyl, the meaning of A and n is the same as in formula I or II, and a third step wherein from 25 to 100% of the tertiary nitrogen atoms of the reaction product obtained in the second step are quaternized, said degree of quaternization may also be obtained by first quaternizing the reaction product obtained in the first step and subsequently carrying out the second step.

13. A process is claimed in claim 12, wherein
in the first step
   (i) a linear or branched polyetherpolymine having a molecular weight of from 120 to 750, 2 to 4 nitrogen atoms and containing 2 to 4 primary or secondary amino nitrogen end groups is reacted with
   (ii) an alkylene oxide selected from the group consisting of ethylene oxide, propylene oxide, butylene oxide and mixtures of the said alkylene oxides, at such a ratio that on each NH group of the polyetherpolyamine 15 to 40 units of the alkylene oxide are added,
in the second step
   the alkoxylated polyetherpolyamine obtained in the first step is reacted with chlorosulfonic acid in such ratio that at least one teritary end group of the polyetherpolyamine contains two groups having the formula

—(A)—X                                                      (I), wherein
A is an ethylene oxide unit, a propylene oxide unit or a butylene oxide unit,
n is 15–40 and
X is SO H, and
in the third step
   the zwittreionic reaction product of the second step is quaternized with dimethyl sulfate, methyl chloride or benzyl chloride.

14. A process as claimed in claim 12, wherein the alkoxylated polyetherpolyamine obtained in the first step is quaternized up to 100% and subsequently reacted with chlorosulfonic acid.

* * * * *